United States Patent [19]

Griffin et al.

[11] 4,216,376

[45] Aug. 5, 1980

[54] NEUTRON INTERFACE DETECTOR

[75] Inventors: Leonard H. Griffin, Pasadena; Richard H. Hunt; Alexander Telfer, both of Houston, all of Tex.

[73] Assignee: Shell Oil Company, Houston, Tex.

[21] Appl. No.: 918,120

[22] Filed: Jun. 22, 1978

[51] Int. Cl.² .......................... G01F 23/00; G01T 3/00
[52] U.S. Cl. ...................................... 250/357; 250/390
[58] Field of Search .............. 250/308, 357, 358, 359, 250/360, 390, 391, 392, 497, 506, 518, 522

[56] References Cited

U.S. PATENT DOCUMENTS

| 2,642,541 | 6/1953 | Young | 250/506 |
| 3,716,711 | 2/1973 | Olesen | 250/390 |
| 3,848,137 | 11/1974 | Ellis | 250/506 |
| 4,039,809 | 8/1977 | Bailey | 250/390 |

*Primary Examiner*—Alfred E. Smith
*Assistant Examiner*—Janice A. Howell

[57] ABSTRACT

An apparatus for measuring the level of a low mass element material in an enclosed vessel. The apparatus comprises a long probe having a source of fast neutrons and a detector of slow neutrons mounted at one end. The length of the probe ensures the safety of the operator and means are provided for remotely depositing the source in a shielded vessel so that it may be safely transported.

5 Claims, 2 Drawing Figures

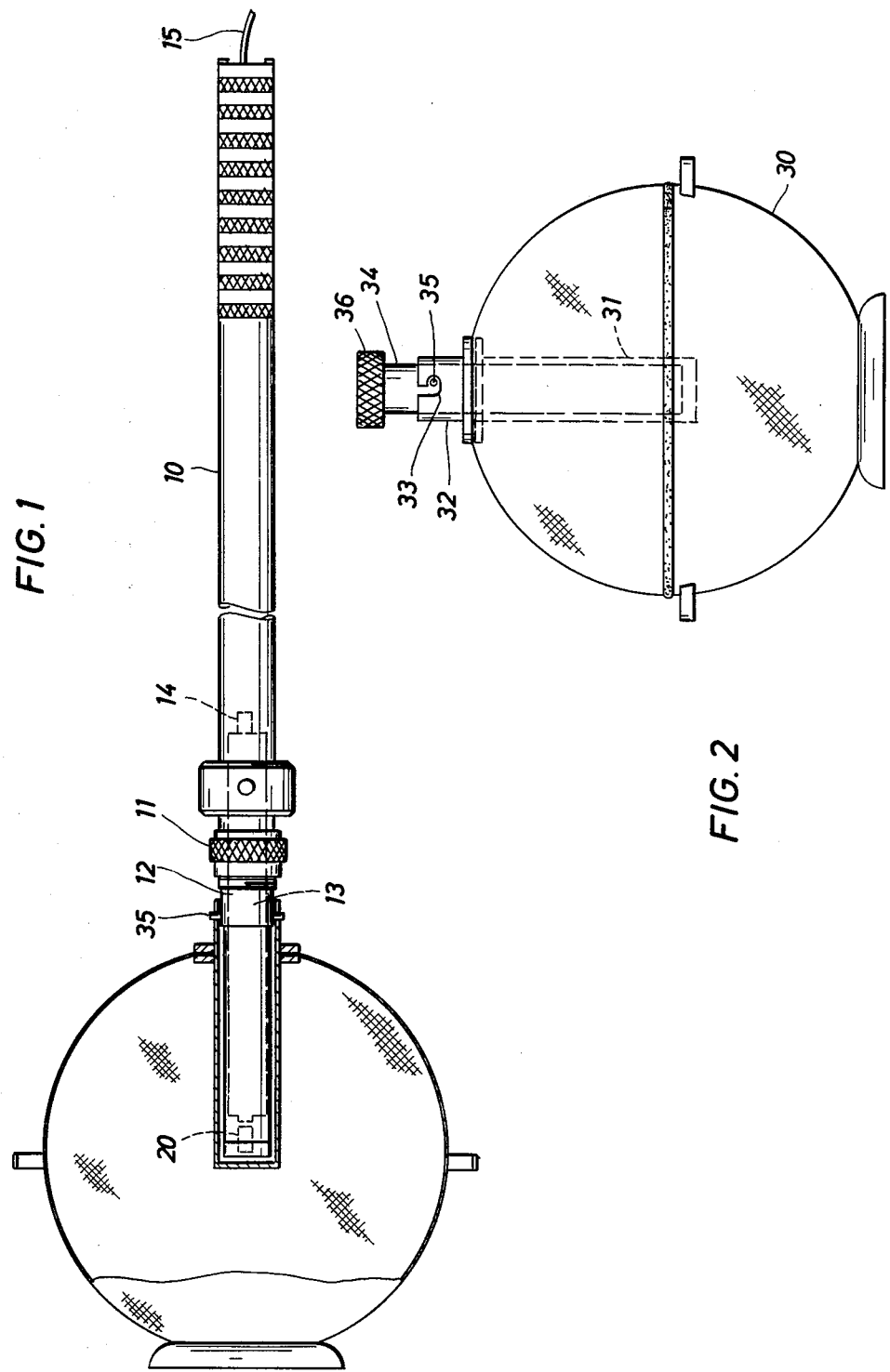

NEUTRON INTERFACE DETECTOR

RELATED PATENT APPLICATIONS

The present invention is related to co-pending application Ser. No. 830,005 filed Sept. 1, 1977, now abandoned and entitled Interface Detection by Neutron Scattering and assigned to the same assignee as the present application.

BACKGROUND OF THE INVENTION

The present invention relates to an apparatus for detecting the level of a low mass number element material within an enclosed vessel using neutron scattering. In U.S. Pat. No. 3,716,711 there is disclosed an apparatus using the technique of neutron scattering to detect the liquid level within an enclosed vessel. While the apparatus disclosed shows a neutron source and a detector for the slow neutrons that are scattered by the hydrogen of the liquid, it is deficient in several respects. For example, the apparatus is relatively bulky due to its construction, and not readily handled by the operator. In addition, no means are provided for protecting the operating personnel from exposure to excessive radiation. This is particularly true when the instrument is transported, since the one side of the instrument is designed so that the fast neutrons from the source may pass through the instrument and the wall of the vessel that encloses the liquid. Obviously, if the source of fast neutrons is made small enough so that the danger of exposure to radiation is reduced to acceptable levels, the ability of the instrument to detect the liquid level in heavy walled vessels will also be reduced. The patent does not describe or illustrate any means for solving this problem.

BRIEF DESCRIPTION OF THE INVENTION

The present invention solves the above problem of the prior art devices by providing an elongated probe leaving a detachable end portion in which the source of fast neutrons is mounted. This permits the detaching storing of the detachable end in a suitable container so that the source may be transported without exposing personnel to excessive radiation. In addition, the length of the probe is made sufficiently long to maintain a spacing between the personnel using the probe and the neutron source, that reduces the radiation exposure below the 40-hour per week limit.

The container used for transporting the detachable end including the neutron source has a spherical shape with a cylindrical recess formed therein. The detachable head is placed in the recess and then removed from the probe. A suitable plug is placed in the recess to complete the shielding of the source. With the source in the container it may be transported from one location to another without risk of exposing personnel to radiation. When it is desired to utilize the apparatus to check the level of a liquid in a vessel, the plug is removed from the transport vessel. The probe can then be inserted into the detachable end containing the neutron source and locked to the probe and the probe with the source attached, withdrawn from the vessel. After completion of the survey the detachable end can be replaced in the transport container and removed from the probe. The combination of the elongated probe and means for storing the source in a transport container provides a simple apparatus for locating liquid levels utilizing the neutron-scattering technique. While the device is simple to use and transport, radiation exposure is always maintained below the 40-hour weekly limit.

BRIEF DESCRIPTION OF THE DRAWING

The present invention will be more easily understood from the following detailed description of a preferred embodiment when taken in conjunction with the attached drawings:

FIG. 1 is an elevation view of the probe, and

FIG. 2 is an elevation view of the transport container showing the detachable end of the probe disposed therein.

PREFERRED EMBODIMENT

Referring now to FIG. 1 there is shown the elevation view of preferred embodiment of the probe. The probe is provided with an elongated handle enhousing 10 with detachable end 12 fastened to the housing 10 by means of a threaded nut 11. The nut 11, of course, can rotate on the housing 10 but is retained thereon by suitable means. A detector 13 for slow neutrons is mounted in the end of the housing and extends into the detachable end member 12. In particular, the detector should be positioned close to the neutron source to increase the sensitivity of the instrument. A suitable detector is a helium-3 neutron detector manufactured by Harshaw Chemical Company, Division of Kewanee Oil Company, Crystal and Electronic Products Department, 6801 Cochran Rd., Solon, Ohio 44139. The terminal 14 on the detector is coupled to cable 15 which is connected to a suitable measuring and recording system. For example, a Portable Scaler Ratemeter Model 2200 system manufactured by Ludlum Measurements, Inc. 1219 E. Broadway, P.O. Box 517, Sweetwater, Tex. 79556, could be used. The fast neutron source 20 is mounted within the detachable end 12 adjacent the end thereof. A suitable source of fast neutrons would be an approximately 50 micro-curie source of Californium-252 comprising approximately 0.1 micrograms of material. The source should in any case be less than about 500 micro-curies to ensure the safety of the operating personnel. When a 50 micro-curie source is used with a probe one meter long the radiation to which the operating personnel are exposed is below the 40-hour per week level.

The container used for transporting the detachable end of the probe containing the fast neutron source is shown in FIG. 2. The container comprises a spherical vessel which is filled with a suitable neutron-absorbing material, such as one pound of boric acid mixed with one gallon of melted paraffin which will provide a suitable neutron absorbing material. The spherical vessel is provided with a cylindrical recess 32 which may comprise a closed end metal tube which is welded to the spherical vessel. The outer end of the cylindrical member is provided with a J-slot 33 in which a radial pin 35 on the detachable end fits. The center of the detachable end is closed by a suitable plug 36 which extends into the interior of the detachable end and threads onto the end thereof. With the installation of the plug in the detachable end the source of fast neutrons is disposed at approximately the center of the spherical container with equal thickness of neutron absorbing material surrounding it. For the fast neutron source described above, a spherical container of 9-inch diameter will provide sufficient absorption of the fast neutrons to permit safe transportation of the source.

When it is desired to couple the detachable end containing the neutron source to the probe, the plug 36 is removed. Due to the low level of the radiation from the source and the short time of the exposure, this is a safe procedure. Once the plug is removed the probe can be inserted into the detachable end and secured thereto by means of the threaded nut 11, shown in FIG. 1. The probe with the detachable end can then be withdrawn from the transportation container and used to measure a liquid level. After the measuring operation is complete the detachable end containing the source can be reinserted into the transportation container and the probe rotated so that pins 35 lock in the J-slot. The probe can then be removed from the detachable end and the transportation plug inserted into the detachable end to secure the source for transportation.

We claim as our invention:

1. An apparatus using the scattering of fast neutrons by a hydrogen-containing liquid to measure the level of the liquid in an enclosed vessel, said apparatus comprising:
    an elongated probe, a source of fast neutrons, said probe in addition having a detachable end piece, said source being mounted in said detachable end piece, the distance between the detachable end piece and the opposite end of the probe being sufficient to reduce the radiation level at said opposite end to no more than 2.5 millirems per hour when said source is less than 500 microcuries;
    a slow neutron detector, said detector being mounted on said probe adjacent said detachable end piece; and,
    circuit means coupled to said slow neutron detector for measuring the response of said slow neutron detector as said probe is moved tangentally along the exterior surface of said enclosed vessel.

2. The apparatus of claim 1 wherein said source of fast neutrons is Californium 252.

3. The apparatus of claim 2 wherein said source has a radiation intensity on the order of 50 micro curie and said probe has a length of approximately one meter.

4. The apparatus of claim 1 and in addition a transport vessel comprising a container filled with neutron absorbing material and having a recess for receiving the detachable end of said probe, a plug member disposed to be inserted into said recess to close the recess after said detachable end is placed in said recess.

5. A method for determining the level of a hydrogen-containing liquid in a closed vessel comprising;
    manually moving a source of fast neutrons along the outer surface of said vessel using an elongated probe to protect the operator from exposure to radiation;
    detecting the slow neutrons produced by the scattering of the fast neutrons by the hydrogen in the liquid; and,
    monitoring the intensity of the detected slow neutrons to locate a change in said intensity, said change indicating said liquid level.

* * * * *